United States Patent [19]

Uchida

[11] Patent Number: 4,988,786
[45] Date of Patent: Jan. 29, 1991

[54] HYDROPHOBIC CROSSLINKED COPOLYMER FROM ETHYLENIC ESTER OR CARBAMATE WITH POLYETHYLENIC MONOMER

[75] Inventor: Takateru Uchida, Yokohama, Japan

[73] Assignee: Asahi Kasei Kogyo Kabushiki Kaisha, Osaka, Japan

[21] Appl. No.: 106,356

[22] Filed: Oct. 9, 1987

[30] Foreign Application Priority Data

Oct. 24, 1986 [JP] Japan .................................. 61-251793
Feb. 24, 1987 [JP] Japan .................................... 62-39018

[51] Int. Cl.$^5$ ............................................ C08F 226/00
[52] U.S. Cl. .................................... 526/261; 210/656; 526/301; 526/323.2; 526/330
[58] Field of Search ............... 526/261, 295, 301, 306, 526/323.2, 330, 328.5, 292.5

[56] References Cited

U.S. PATENT DOCUMENTS

| | | |
|---|---|---|
| 4,085,042 | 4/1978 | Misumi et al. |
| 4,216,548 | 8/1980 | Kraus |
| 4,339,500 | 7/1982 | Yanagihara et al. |
| 4,358,546 | 11/1982 | Naomi et al. |
| 4,368,275 | 1/1983 | Yanagihara et al. |
| 4,416,783 | 11/1983 | Noguchi et al. |
| 4,452,918 | 6/1984 | Uchida et al. .................. 521/52 |
| 4,497,710 | 2/1985 | Wagu et al. |
| 4,543,363 | 9/1985 | Yanagihara |

FOREIGN PATENT DOCUMENTS

| | | |
|---|---|---|
| 2513895 | 4/1983 | France |
| 34937 | 10/1971 | Japan |
| 64242 | 6/1978 | Japan |
| 58-61463 | 4/1983 | Japan |
| 2061954 | 5/1981 | United Kingdom |
| 2107333 | 4/1983 | United Kingdom |
| 2169303 | 7/1986 | United Kingdom |

OTHER PUBLICATIONS

Abstract of 7th Liquid Chromatography Forum Held in Tokyo, Oct. 28-30, 1986, K. Yasukawa et al., "Chromatographic Characteristics of Asahipak ODP Columns Packed with Octadecyl-Bonded Polymer Gel".
Abstract of the 30th Liquid Chromatography Forum Held in Kyoto on Jan. 27-28, 1987, K. Yasukawa et al., "Polymer C18 Gel Packed Column, Characteristics of Asahipak ODP: No. 2".
Technical Information Bulletin (Asahipack HPLC Column) Published by Asahi Kasei Kogyo Kabushiki Kaisha in Jan. 1987, and Entitled "High Performance Liquid Chromatography Packed Column (Asahipak): 1987 Technical Data Summary".
Technical Information Bulletin Published by Asahi Kasei Kogyo Kabushiki Kaisha on Feb. 17, 1987, and Entitled "Announcement of Sale of a New Grade Asahipak".
Roelof F. Rekker, "The Hydrophobic Fragmental Constant", Elsevier Scientific Publishing Co., 1977.
Japanese Version of L. F. Frieser & M. Frieser "Advanced Organic Chemistry" Published by Reinhold Publishing Corp., U.S.A. in 1961.
"High Speed Liquid Chromatography Handbook", Edited by the Kanto Branch of Japanese Society of Analytical Chemistry and Published by Maruzen Co., Ltd. Japan.

*Primary Examiner*—Christopher Henderson
*Attorney, Agent, or Firm*—Birch, Stewart, Kolasch & Birch

[57] ABSTRACT

A hydrophobic crosslinked copolymer havng a pendant group selected from

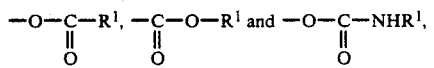

wherein $R^1$ represents at least one hydrophobic group having a hydrophobic fragmental constant of at least 1.5, which copolymer has a high crosslinking monomer units content, a specific surface area and a specific acetonitrile regain value. The hydrophobic crosslinked copolymer has a high rigidity as well as an excellent mechanical strength and an excellent chemical stability so that the copolymer is useful as a packing for liquid chromatography, particularly reversed phase partition chromatography. This hydrophobic crosslinked copolymer can be advantageously produced by a method in which a crosslinked copolymer having a side chain of small length is first produced, and then a substitution reaction to introduce a hydrophobic group of large length is effected with respect to the side chain of small length.

3 Claims, No Drawings

HYDROPHOBIC CROSSLINKED COPOLYMER FROM ETHYLENIC ESTER OR CARBAMATE WITH POLYETHYLENIC MONOMER

BACKGROUND OF THE INVENTION

1. Field Of The Invention

The present invention relates to a hydrophobic crosslinked copolymer and a method for producing the same. More particularly, the present invention is concerned with a hydrophobic crosslinked copolymer having a pendant carboxylate or urethane group, which copolymer has a high crosslinking monomer unit content, a specific surface area and a specific acetonitrile regain value. Also, the present invention is concerned with an effective method for producing the above-mentioned hydrophobic cross-linked copolymer.

The hydrophobic crosslinked copolymer of the present invention has a high rigidity as well as an excellent mechanical strength and an excellent chemical stability, so that the copolymer is especially useful as a packing for reversed phase partition chromatography. By the use of this hydrophobic crosslinked copolymer, separation and analysis of substances can be conducted at a high speed and a high resolution.

DISCUSSION OF RELATED ART

Liquid chromatography permits separation and analysis of substances under mild conditions, so that it is suited for separation and analysis of biological and physiological substances. Accordingly, liquid chromatography is widely utilized in the fields of biochemistry, medicine and pharmacology.

According to the mechanism of separation, liquid chromatography is generally classified into gel permeation chromatography, partition chromatography including reversed phase partition chromatography, adsorption chromatography and ion exchange chromatography. Various packings have been proposed for each of these chromatographies. For example, in U.S. Pat. No. 4,368,275, it was proposed to use gels having a non-ionic hydrophilic group as a packing for gel permeation chromatography. On the other hand, in U.S. Pat. No. 4,543,363, it was proposed to use gels having a carboxyl group or an amino group as a packing for ion exchange chromatography.

With respect to the reversed phase partition chromatography widely employed due to its excellent separation performance in which a hydrophobic interaction between the substances to be separated and the packing material is utilized, it is known in the art that gels comprising a silica gel as a matrix, e.g. gel (generally known as ODS) comprising a silica gel and, immobilized onto the surface thereof, octadecylsilyl groups are useful as a packing therefor. The silica gel is soluble in an aqueous alkali solution, and hence the gels comprising a silica gel as a matrix have a drawback in that these are chemically unstable. Moreover, the gels comprising a silica gel as a matrix have a drawback in that these adsorb strongly onto basic substances such as amines, basic peptides and the like, presumably due to the action of the silanol groups which are present on the surface of the silica gel.

In the reversed phase partition chromatography, further, gels produced by polymerization of solely a methacrylate-based crosslinking agent such as ethylene glycol dimethacrylate or the like and gels produced by copolymerization of such, a crosslinking agent with a methacrylate-based monomer such as methyl methacrylate or the like are also employed as a packing therefor. The hydrophobic interaction of these gels is attributed to the property of the polymer per se. These gels are generally excellent in chemical stability but are often inferior in separation performance as compared to the above-mentioned gels comprising a silica gel as a matrix. When separation of a highly hydrophobic component is conducted using a column packed with these gels, the elution band width of the component tends to be disadvantageously large.

Also, it was proposed in Japanese Patent Application Laid-open Specification No. 58-61463/1983 (corresponding to U.S. Pat. No. 4,497,710 and U.K. Patent No. 2,107,333) to use gels which are produced by copolymerization of a vinyl ester or methacrylic ester having a long side chain of alkyl group with a crosslinking agent as a packing for the reversed phase partition chromatography. These gels do not have a desirable rigidity, and therefore have a drawback in that these are deformed during the passing of an eluent, thereby causing the packing conditions of the gels packed in a column to be changed. These gels cannot be suitably employed for high speed, high resolution liquid chromatography.

SUMMARY OF THE INVENTION

With a view toward developing a packing for liquid chromatography which is free from the above-mentioned drawbacks of the known gels, the present inventor has conducted extensive and intensive studies. As a result, the present inventor has unexpectedly found that a hydrophobic crosslinked copolymer having a pendant carboxylate group of the formula

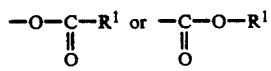

or a pendant urethane group of the formula

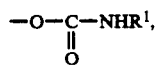

wherein $R^1$ represents a hydrophobic group having a hydrophobic fragmental constant of at least 1.5, which copolymer has a high crosslinking monomer unit content, a specific surface area and a specific acetonitrile regain value, provides an excellent packing for liquid chromatography. Based on this novel finding, the present invention has been completed.

Accordingly, it is an object of the present invention to provide a novel hydrophobic crosslinked copolymer having an excellent chemical stability and a high rigidity as well as an excellent mechanical strength and exhibiting a high resolution for the substances to be separated, which copolymer is extremely suitable for use as a packing for reversed phase partition chromatography.

It is another object of the present invention to provide a novel, effective method for producing the above-mentioned hydrophobic crosslinked copolymer.

The foregoing and other objects, features and advantages of the present invention will be apparent from the following detailed description and appended claims.

DETAILED DESCRIPTION OF THE INVENTION

In one aspect of the present invention, there is provided a hydrophobic crosslinked copolymer comprising:

(A) 100 parts by weight of monomer units comprising:

(1) 10 to 100% by weight, based on the total weight of the monomer units (A), of a monomer unit represented by the formula selected from the group consisting of:

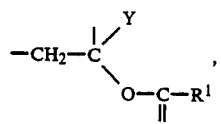　(I)

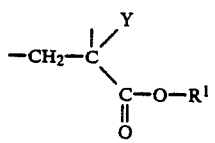　(II)

and

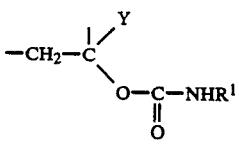　(III)

wherein $R^1$ represents at least one hydrophobic group having a hydrophobic fragmental constant of at least 1.5, and Y represents a hydrogen atom or a methyl group; and (2) 0 to 90% by weight, based on the total weight of the monomer units (A), of monomer units other than the monomer units of the formulae (I), (II) and (III); and (B) 90 to 6000 parts by weight of crosslinking monomer units derived from a crosslinking agent having at least two unsaturated groups, in which each of said groups is a member selected from the group consisting of an ethylenically unsaturated group and an acetylenically unsaturated group; and wherein said copolymer has:

a specific surface area (SA) in the range satisfying the inequality:

$$30 \leq SA \leq 1000 \ m^2/g; \text{ and}$$

an acetonitrile regain value (AR) in the range satisfying the inequality:

$$0.2 \leq AR \leq 3.0 \ ml/g.$$

The monomer units represented by the formulae (I) and (II) may be formed by effecting polymerization or copolymerization of monomers represented by the formulae (I') and (II'), respectively, as indicated below:

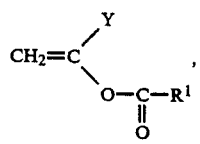　(I')

and

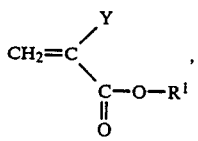　(II')

wherein Y and $R^1$ are as defined above. Alternatively, the monomer units represented by the formulae (I), (II) and (III) may be formed by effecting polymerization or copolymerization of a monomer represented by the formula:

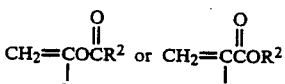

(V)　　(VI)

wherein Y is as defined above, and $R^2$ represents a methyl group or an ethyl group, followed by partially or wholly substituting the

of the resulting polymer or copolymer with

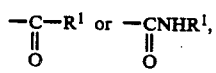

in which $R^1$ is as defined above, or partially or wholly substituting the $-OR^2$ of the resulting polymer or copolymer with $-OR^1$, in which $R^1$ is as defined above.

Each of the monomer units represented by the formulae (I), (II) and (III) has a hydrophobic group having a hydrophobic fragmental constant of at least 1.5. With respect to the hydrophobic fragmental constant, reference may be made to, for example, Roelof F. Rekker "The Hydrophobic Fragmental Constant" published by Elsevier Scientific Publishing Company, the Netherlands, in 1977. Examples of the hydrophobic group having a hydrophobic fragmental constant of at least 1.5 are alkyl groups having 3 to 30 carbon atoms. Of these, alkyl groups having 4 to 30 carbon atoms, such as a heptyl group and a heptadecyl group, are preferred. Other examples of the hydrophobic group having a hydrophobic fragmental constant of at least 1.5 are groups represented by the formula:

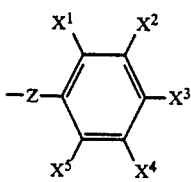　(IV)

wherein Z represents a bond or an alkylene group of the formula $-C_nH_{2n}-$ in which n is an integer of 1 to 30, and $X^1$, $X^2$, $X^3$, $X^4$ and $X^5$ each independently represent a member selected from the group consisting of a hydrogen atom, a chlorine atom, a bromine atom, an iodine atom and an alkyl group having 1 to 30 carbon atoms. Examples of the groups represented by the formula (IV) are a phenyl group and a tolyl group. These hydrophobic groups may be employed alone or in combination.

The ratio of the amount of the crosslinking monomer units to that of the monomer units (A) comprising a monomer unit represented by the formula selected from the group consisting of the formulae (I), (II) and (III) and comprising monomer units other than the monomer units of the formulae (I), (II) and (III), are critically important because the ratio markedly affects the mechanical strength and rigidity of the copolymer and the partition characteristics when chromatography is conducted using a column packed with the copolymer.

The hydrophobic crosslinked copolymer of the present invention contains, per 100 parts by weight of the monomer units (A), 90 to 6000 parts by weight of crosslinking monomer units. When the amount of the crosslinking monomer units is more than 6000 parts by weight per 100 parts by weight of the monomer units (A), the hydrophobic group content of the copolymer is so small that the interaction in a liquid chromatography column between the substances to be separated and the copolymer is not sufficient, thereby causing the separation of the substances to be unsatisfactory. On the other hand, when the amount of the crosslinking monomer units is less than 90 parts by weight per 100 parts by weight of the monomer units (A), the mechanical strength and rigidity of the crosslinked copolymer are not sufficient so that chromatography by the use of the copolymer is disadvantageously accompanied by deformation of the gels and the packing conditions of the gels change, which leads to incomplete separation of substances and troubles such as stoppage of the eluent flow or the like. When the amount of the crosslinking monomer units is in the range of from 90 to 6000 parts by weight per 100 parts by weight of the monomer units (A), the mechanical strength and rigidity of the crosslinked copolymer are advantageously high, so that chromatography by the use of the copolymer ensures an excellent separation of substances, i.e. exhibiting a desirably small elution band width and a desirably large number of theoretical plates.

Japanese Patent Application Laid-open Specification No. 58-61463/1983 (corresponding to U.S. Pat. No. 4,497,710 and U.S. Patent No. 2,107,333) mentioned hereinbefore teaches that the amount of the crosslinking agent should be 10 to 80 parts by weight, preferably 15 to 60 parts by weight, per 100 parts by weight of the monomer units, and that above 80 parts by weight, the copolymer is fragile and the copolymer's loading capacity of specimen is decreased. In fact, in all of the Examples of this publication, in actuality, the amount of the crosslinking agent is less than 80 parts by weight per 100 parts by weight of the monomer units. Contrary to the teaching of this publication, in the present invention, the crosslinking monomer unit content of the crosslinked copolymer is not lower than 90 parts by weight per 100 parts of the monomer units (A). It is surprising from the knowledge in the art that the employment of the crosslinking monomer units in an amount of 90 parts or more gives advantageous results, as mentioned above, as compared to the employment of the crosslinking monomer units in an amount of less than 90 parts by weight per 100 parts of the monomer units (A).

In the present invention, the crosslinking monomer units are derived rom a crosslinking agent having at least two unsaturated groups, in which each of said groups is a member selected from the group consisting of an ethylenically unsaturated group and an acetylenically unsaturated group. The terminology "derived from" as used herein means "formed by polymerization or copolymerization of". Examples of the crosslinking agent suitably employed are polymethacrylates such as (poly)ethylene glycol dimethacrylate, trimethylolpropane trimethacrylate or the like; polyvinyl esters such as divinyl adipate, divinyl phthalate or the like; and polyvinyl ethers such as divinyl ether or the like. Further, examples of the crosslinking agent suitably employed are compounds having a triazine ring such as those represented by the formula:

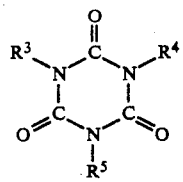

(VII)

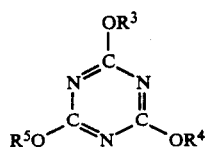

(VIII)

in which $R^3$, $R^4$ and $R^5$ each independently represent $-CH_2-CH=CH_2$, $-CH_2-C\equiv CH$ or

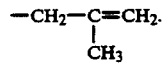

Of these, triallyl isocyanurate which is a compound of formula (VII) wherein all of $R^3$, $R^4$ and $R^5$ are $-CH_2-CH=CH_2$ is preferred. Examples of the monomer units other than the monomer units of the formulae (I), (II) and (III) are monomer units derived from vinyl acetate, vinyl propionate, methyl acrylate and methyl methacrylate.

The amount of each of the monomeric units (I), (II) and (III), monomeric units other than mentioned above and crosslinking units can be determined, for example, as follows. In the case where the crosslinked copolymer consists of the monomeric units (I) and the crosslinking units, the amount of each of these units can be determined by hydrolyzing the crosslinked copolymer and measuring the amount of carboxylic acid liberated by the hydrolysis, the amount of hydroxyl groups, formed by the hydrolysis, of the copolymer and the change in the weight of the crosslinked copolymer before and after the hydrolysis. In the case where the crosslinked copolymer consists of the monomeric units (II) and the crosslinking units, the amount of each of these units can be determined by hydrolyzing the crosslinked copolymer and measuring the amount of the alcohol liberated by the hydrolysis, the amount of the carboxyl groups, formed by the hydrolysis, of the copolymer and the change in the weight of the crosslinked copolymer before and after the hydrolysis. In the case where the crosslinked copolymer consists of the monomeric units (III) and the crosslinking units, the amount of each of these units can be determined by hydrolyzing the crosslinked copolymer and measuring the amount of the amine liberated by the hydrolysis, the amount of hydroxyl groups, formed by the hydrolysis, of the copolymer and the change in the weight of the crosslinked copolymer before and after the hydrolysis. In the case where the crosslinked copolymer consists of a mixture of any one of the monomeric units (I), (II) and (III) with monomeric units other than those mentioned above and the crosslinking units, the amounts of these units can be determined by hydrolyzing the crosslinked copolymer and measuring the amounts of the the carboxylic acid, alcohol and/or amine liberated by the hydrolysis, the amounts of the carboxyl groups and/or hydroxyl groups, formed by the hydrolysis, of the copolymer and the change in the weight of the crosslinked copolymer before and after the hydrolysis. The amounts of the units constituting the crosslinked copolymer can alternatively be determined from an NMR spectrum of the crosslinked copolymer.

The crosslinked copolymer of the present invention generally has an acetonitrile regain value (AR) of 0.2 to 3.0 ml/g. The terminology "acetonitrile regain value" as used herein means the amount of acetonitrile which is contained in the pores of the crosslinked copolymer when the copolymer has been equilibrated with acetonitrile, which amount is expressed in terms of the volume of acetonitrile per gram of the crosslinked copolymer in the dry state. The acetonitrile regain value is a criterion of the porosity of the crosslinked copolymer. A crosslinked copolymer having too large an acetonitrile regain value, such as more than 3.0 ml/g, exhibits a poor mechanical strength in an organic solvent or a mixed solvent of an organic solvent and water, presumably due to the relative smallness of the solid portion of the copolymer per unit volume of the copolymer. On the other hand, a crosslinked copolymer having too small an acetonitrile regain value, such as less than 0.2 ml/g, has a small pore volume so that the copolymer exhibits a poor separating capacity when it is incorporated in a column and used for liquid chromatography. It is preferred that the acetonitrile regain value be in the range of from 0.5 to 0.2 ml/g.

The acetonitrile regain value (AR) of a crosslinked copolymer may be determined as follows. The crosslinked copolymer which has been sufficiently equilibrated with acetonitrile is subjected to centrifugation to remove the acetonitrile which adheres to the surface of the copolymer. For example, the copolymer equilibrated with acetonitrile is put into a centrifuge tube having a bottom portion made of a glass filter. Then, centrifugation is effected at 0° C. at 3000 rpm for 60 min using a centrifugal separator (Kubota KR/180A available from Kubota Shoji K. K., Japan) to remove the acetonitrile. Then, the weight of the copolymer ($W_1$) is measured. After drying the copolymer, the weight of the dried copolymer ($W_2$) is measured. The acetonitrile regain value (AR) is calculated from the following formula:

$$AR = \frac{W_1 - W_2}{W_2} \times \frac{1}{S}$$

wherein S represents the specific gravity of acetonitrile at 15° C.

The acetonitrile regain value of a crosslinked copolymer increases with the increase of the amount of an organic solvent added to a monomer mixture to be copolymerized in order to produce the copolymer.

The crosslinked copolymer of the present invention generally has a specific surface area of 30 to 1000 $m^2/g$ per gram of the crosslinked copolymer in the dry state. Preferably, the specific surface area may be 50 to 1000 $m^2/g$. Since the crosslinked copolymer of the present invention has a large specific surface area as compared to that of the conventional polymers, in conducting liquid chromatography using a column packed with the crosslinked copolymer of the present invention, the components of a chromatography sample can be effectively brought into contact with the copolymer, thereby ensuring rapid sorption(distribution) and desorption between the sample components and the copolymer. Therefore, when a column packed with the copolymer of the present invention is employed in liquid chromatography, the elution band width is small with respect to each of the sample components and effective separation can be accomplished therebetween.

In the present invention, the specific surface area of the crosslinked copolymer is determined by the customary BET method in which gaseous nitrogen is used. Any sample to be subjected to the measurement of the specific surface area must be sufficiently dry. Accordingly, in the present invention, the copolymer is equilibrated with acetone and dried at 60° C. under reduced pressure before the specific surface area of the crosslinked copolymer is measured.

In general, the specific surface area of a crosslinked copolymer increases, as the proportion of the crosslinking units in the copolymer is increased. In the present invention, the specific surface area of the crosslinked copolymer is in the range of from 30 to 1000 $m^2/g$. From the viewpoint of obtaining a crosslinked copolymer having a specific surface area within the above-mentioned range, it is required that the amount of the crosslinking monomer units be 90 to 6000 parts by weight per 100 parts by weight of the monomer units (A).

The shape of the crosslinked copolymer is not critical in the present invention. The copolymer may take any arbitrary form such as granular form, particulate form, globular form, sheet form, fibrous form, and bulk form, depending on the field of application. In the case where the crosslinked copolymer is used as a packing for a column for use in liquid chromatography, it is preferred that the copolymer be in a particulate or globular form. In this case, the weight average diameter of the particulate or globular copolymer is not limited, but is generally in the range of from 1 to 500 μm. In the case where the crosslinked copolymer of the present invention is used as a packing for a column for use in high performance liquid chromatography, the particle diameter of the copolymer is generally in the range of from 1 to 20 μm. In practice, it is preferred that the particle diameter be in the range of from 1 to 15 μm.

The hydrophobic crosslinked copolymer of the present invention may be produced according to various methods.

For example, of the hydrophobic crosslinked copolymers according to the present invention, those comprising (A) 100 parts by weight of monomer units comprising (1) 10 to 100% by weight, based on the total weight of the monomer units (A), of a monomer unit represented by the formula (I) or (II) and (2) 0 to 90% by weight, based on the total weight of the monomer units (A), of monomer units other than the monomer units of the formulae (I) and (II) and (B) 1000 to 6000 parts by weight of crosslinking monomer units may be produced by a direct copolymerization method in which (A') 100 parts by weight of a monomer mixture comprising (1) 10 to 100% by weight, based on the total weight of the monomer (A'), of a monomer represented by the formula:

 (I')

or

 (II')

and (2) 0 to 90% by weight, based on the total weight of the monomer (A'), of a monomer copolymerizable with the monomer of the formula (I') or (II') is copolymerized with (B') 1000 to 6000 parts by weight of a crosslinking agent having at least two unsaturated groups, in which each of said groups is a member selected from the group consisting of an ethylenically unsaturated group and an acetylenically unsaturated group and being copolymerizable with the monomer (A'). As is apparent from the foregoing, the above-mentioned direct copolymerization method is limited to preparation of hydrophobic crosslinked copolymers having monomer units of the formula (I) or (II), exclusive of that of the formula (III), and having a high crosslinking unit content, i.e. 1000 to 6000 parts by weight of crosslinking monomer units per 100 parts by weight of the monomer units (A). As the monomer represented by the formula (I'), there may be mentioned, for example, vinyl octanoate, vinyl myristate, vinyl palmitate, vinyl stearate and the like. As the monomer represented by the formula (II'), there may be mentioned, for example, octyl methacrylate, lauroyl methacrylate, stearyl methacrylate and the like. As the crosslinking agent, there may be mentioned those mentioned hereinbefore. As the monomer copolymerizable with the monomer of the formula (I') or (II'), there may be mentioned, for example, vinyl acetate, vinyl propionate, methyl acrylate, methyl methacrylate and the like. The method of copolymerization is not critical, and it includes suspension polymerization, solution polymerization, bulk polymerization or the like. For producing a crosslinked, copolymer suitable as a packing for a column for use in liquid chromatography, suspension polymerization is preferred from the viewpoint of the ease in obtaining desirable particles having a specific surface area of from 30 to 1000 m²/g and an acetonitrile regain value of from 0.2 to 3.0 ml/g. In producing the hydrophobic crosslinked copolymer of the present invention according to the above method, an organic solvent, a linear polymer or rubber and/or a suspension stabilizer may be added to a mixture of a monomer or monomers and a crosslinking agent in order to regulate the characteristics of the resulting copolymer such as acrylonitrile regain value, porosity, flexibility and average particle diameter. Also, an initiator may be added in order to accelerate the copolymerization reaction. The particulars of the addition of these substances are substantially the same as described below with respect to another method for producing the hydrophobic crosslinked copolymer of the present invention.

More preferably than the above method, any one of the hydrophobic crosslinked copolymers according to the present invention can be advantageously produced by the following novel two-step method. That is, first, a crosslinked copolymer having a side chain of small length is produced, and then a substitution reaction to introduce a hydrophobic group of large length is effected with respect to the side chain of small length. Accordingly, in another aspect of the present invention, there is provided a two-step method for producing a hydrophobic crosslinked copolymer comprising:

(A) 100 parts by weight of monomer units comprising:
(1) 10 to 100% by weight, based on the total weight of the monomer units (A), of a monomer unit represented by the formula selected from the group consisting of:

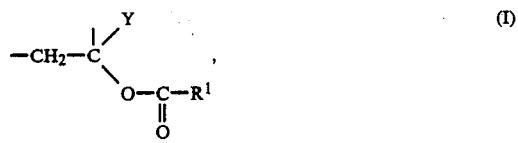 (I)

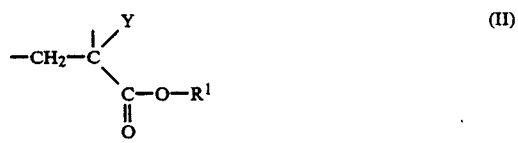 (II)

and

 (III)

wherein $R^1$ represents a hydrophobic group having a hydrophobic fragmental constant of at least 1.5, and Y represents a hydrogen atom or a methyl group; and (2) 0 to 90% by weight, based on the total weight of the monomer units (A), of monomer units other than the monomer units of the formulae (I), (II) and (III); and (B) 90 to 6000 parts by weight of crosslinking monomer units derived from a crosslinking agent having at least two unsaturated groups, in which each of said groups is a member selected from the group consisting of an ethylenically unsaturated group and an acetylenically unsaturated group; and wherein said copolymer has:
a specific surface area (SA) in the range satisfying the inequality;

$$30 \leq SA \leq 1000 \text{ m}^2/\text{g; and}$$

an acetonitrile regain value (AR) in the range satisfying the inequality:

$$0.2 \leq AR \leq 3.0 \text{ ml/g,}$$

which method comprises the steps of:
(1) copolymerizing a monomer represented by the formula:

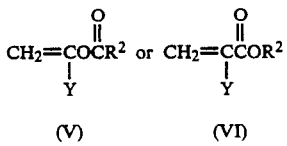

(V)    (VI)

wherein Y is an defined above, and $R^2$ represents a methyl group or an ethyl group,
with a crosslinking agent having at least two unsaturated groups, in which each of said groups is a member selected from the group consisting of an ethylenically unsaturated group and an acetylenically unsaturated group, said agent being copolymerizable with said monomer, thereby obtaining an intermediate copolymer having a

group or a —$OR^2$ group; and
(2) partially or wholly substituting the

group of the intermediate copolymer with a

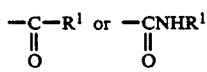

group, in which $R^1$ is as defined above, or partially or wholly substituting the —$OR^2$ group of the intermediate copolymer with a —O—$R^1$ group, in which $R^1$ is as defined above.

The above two-step method of the present invention can be advantageously employed for producing any type of hydrophobic crosslinked copolymer according to the present invention, as different from the above-mentioned direct copolymerization method which is limited to preparation of hydrophobic crosslinked copolymers having monomer units of the formula (I) or (II), exclusive of that of the formula (III), and having a high crosslinking unit content, i.e. 1000 to 6000 parts by weight of crosslinking monomer units per 100 parts by weight of the monomer units (A).

In the method of the present invention as mentioned just above, a crosslinked copolymer having a side chain of small length is first produced, and then a substitution reaction to introduce a hydrophobic group of large length is effected with respect to the side chain of small length.

In the first step of the method of the present invention, a monomer of the formula (V) or (VI) is copolymerized with a crosslinking agent to obtain an intermediate copolymer having a

group or —$OR^2$ group. Examples of the crosslinking agent to be employed in the present invention are as set forth hereinbefore.

As described hereinafter, the substitution reaction in the second step can be conducted according to various modes. It is to be noted that once a mode is selected to conduct the substitution reaction in practicing the method of the present invention, an appropriate amount ratio of the monomer (V) or (VI) to the crosslinking agent and a degree of substitution can be readily calculated so as to obtain a crosslinked copolymer comprising 100 parts by weight of the monomer units (A), which comprises 10 to 100% by weight, based on the total weight of the monomer units (A), of the monomer units of the formulae (I), (II) or (III) and 0 to 90% by weight, based on the total weight of the monomer units (A), of monomer units other than the monomer units of the formulae (I), (II) and (III), and 90 to 6000 parts by weight of crosslinking monomer units.

The method of copolymerization is not critical, and it includes suspension polymerization, solution polymerization, bulk polymerization or the like. For producing a crosslinked copolymer suitable as a packing for a column for use in liquid chromatography, suspension polymerization is preferred from the viewpoint of the ease in obtaining desirable particles having a specific surface area of from 30 to 1000 m$^2$/g and an acetonitrile regain value of from 0.2 to 3.0 ml/g.

In the first step of the method of the present invention, an appropriate amount of at least one type of organic solvent capable of dissolving a mixture of a monomer of the formula (V) or (VI) and a crosslinking agent (hereinafter referred to as "monomer mixture") may be added to the monomer mixture before copolymerization thereof in order to regulate the acetonitrile regain value of the resulting crosslinked copolymer. The larger the amount of the organic solvent added, the higher the acetonitrile regain value(AR) of the resulting copolymer. In order to obtain a crosslinked copolymer having an AR value in the range as required in the present invention, i.e. 0.2 to 3.0 ml/g, the amount of the organic solvent to be added is generally 20 to 300 parts by weight per 100 parts by weight of the monomer mixture.

As the organic solvent capable of dissolving the monomer mixture, there may be mentioned, for example, an aromatic hydrocarbon such as toluene and xylene; an aliphatic hydrocarbon such as heptane, octane, cyclohexane and decaline; a fatty acid ester such as n-butyl acetate, isobutyl acetate, n-hexyl acetate and dioctyl adipate; an aromatic ester such as dimethyl phthalate, dioctyl phthalate and methyl benzoate; and an alcohol such as butanol, heptanol and octanol. It is preferred that an organic solvent having a low solubility in water be employed.

A linear polymer or rubber which is soluble in the monomer mixture may be added to the monomer mixture in order to control the porosity and/or increase the flexibility of the crosslinked copolymer produced. As the linear polymer soluble in the monomer mixture, there may be mentioned, for example, polyvinyl acetate, polystyrene and the like. As the rubber soluble in the monomer mixture, there may be mentioned, for example, chloroprene rubber, butadiene rubber and the like. The linear polymer or rubber soluble in the monomer mixture may be used in an amount of 20 parts by weight or less, preferably 10 parts by weight or less, per 100 parts by weight of the monomer mixture.

An initiator may be used in copolymerization. The type and amount of the initiator to be used may vary depending on the type of copolymerization method. For suspension polymerization or bulk polymerization, a radical polymerization initiator may be used, which includes an initiator of azo type such as 2,2'-azobisisobutyronitrile or 2,2'-azobis(2,4-dimethylvaleronitrile) and an initiator of peroxide type such as benzoyl peroxide or lauroyl peroxide.

If desired, also, a comonomer copolymerizable with the monomer of the formula (V) or (VI) and the crosslinking agent may be employed in combination with the monomer and the crosslinking agent in the first step of the method of the present invention.

Further, it may be preferable to add to the aqueous phase a customarily used suspension stabilizer of organic polymer type such as polyvinyl alcohol or methyl cellulose. In this case,, if necessary, a pH buffer such as sodium phosphate or the like may also be added to the aqueous phase in combination with the suspension stabilizer.

In the case where a crosslinked copolymer in the form of particles is produced, the average diameter of the particles may be controlled by changing the type and amount of the suspension stabilizer used, or by varying the agitation rate during copolymerization. Before use as a packing for a liquid chromatography column, it may be desirable to remove from the copolymerization product any linear polymer, any residual monomer and any organic solvent, and to conduct classification for obtaining desired particle diameters.

In the second step of the method of the present invention, the

group of the intermediate copolymer is partially or wholly substituted with a

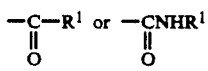

group or the —OR² group of the intermediate copolymer is partially or wholly substituted with a —O—R¹ group.

It is noted that in the case of a partial substitution in the second step of the present method, the monomer units having a

group or —OR² group remaining unsubstituted correspond to the monomer units other than the monomer units of the before in defining the hydrophobic crosslinked copolymer of the present invention.

The substitution reaction with respect to the intermediate copolymer may be conducted by ester interchange or esterification. For example, to attain the substitution, an intermediate copolymer as obtained by copolymerization of a monomer of the formula (V) with a crosslinking agent may be subjected to an ester interchange reaction with an ester represented by the formula

 (IX)

wherein R¹ is as defined above and R³ represents a methyl group, an ethyl group or a hydrophobic group having a hydrophobic fragmental constant of at least 1.5, thereby obtaining a crosslinked copolymer having monomer units of the formula (I). In another example, to attain the substitution, an intermediate copolymer as obtained by copolymerization of a monomer of the formula (VI) with a crosslinking agent may be subjected to an ester interchange reaction with an ester represented by the formula

wherein R¹ and R³ are as defined above, thereby obtaining a crosslinked copolymer having monomer units of the formula (II). In a further example, to attain the substitution, an intermediate copolymer as obtained by copolymerization of a monomer of the formula (V) with a crosslinking agent may be saponified in the manner, for example, as described in Japanese Patent Application Laid-Open Specification No. 57-108662, followed by an esterification reaction with a carboxylic acid or an anhydride containing a hydrophobic group having a hydrophobic fragmental constant of at least 1.5, thereby obtaining a crosslinked copolymer having monomer units of the formula (I). In still a further example, to attain the substitution, an intermediate copolymer as obtained by copolymerization of a monomer of the formula (VI) with a crosslinking agent may be saponified, followed by an esterification reaction with an alcohol containing a hydrophobic group having a hydrophobic fragmental constant of at least 1.5, thereby obtaining a crosslinked copolymer having monomer units of the formula (II). In the above-mentioned examples of the substitution, the ester interchange and esterification may be conducted according to customary procedures [see L. F. Fieser & M. Fieser, "Advanced Organic Chemistry" published by Reinhold Publishing Corporation, U.S.A., in 1961].

Also, in practicing the method of the present invention, the substitution with respect to the intermediate copolymer may be conducted by a method in which an intermediate copolymer as obtained by copolymerization of a monomer of the formula (VI) with a crosslinking agent is first saponified and then reacted with an isocyanate containing a hydrophobic group having a hydrophobic fragmental constant of at least 1.5, thereby obtaining a crosslinked copolymer having monomer units of the formula (III).

Besides the above, more preferably, the substitution with respect to the intermediate copolymer may be conducted as follows. An intermediate copolymer as obtained by copolymerization of a monomer of the formula (V) with a crosslinking agent is saponified, followed by reaction with a carboxylic acid halide represented by the formula

 (XI)

wherein R¹ is as defined above and X⁶ represents a chlorine atom, a bromine atom or an iodine atom, thereby obtaining a crosslinked copolymer of the present invention. The above-mentioned reaction of the saponified intermediate copolymer with a halide of a carboxylic acid may be carried out by contacting the saponified copolymer with a halide of a carboxylic acid in the presence of a dehydrohalogenation agent such as pyridine in a solvent such as toluene. The amount of the carboxylic acid halide to be used in the reaction depends on the amount of the group $R^1$ to be introduced into the copolymer. It is generally about 0.1 to 3 times by mole that of the hydroxyl groups in the saponified copolymer. The reaction temperature is not critical but generally is in the range of from 0° to 100° C. This method is preferred for its mild reaction conditions and short reaction time.

The method of the present invention is especially suitable for producing a crosslinked copolymer having hydrophobic groups of high bulkiness, which copolymer has an extremely high mechanical strength. The hydrophobic crosslinked copolymer obtained by the method of the present invention can not only suitably be used in the form of particles of even large diameters, such as 100 μm or more, as a packing for a column for use in chromatography on a commercial scale in which separation is effected under low pressure but also can very suitably be used in the form of particles of small diameters, such as 20 μm or less, as a packing for a column for use in high performance liquid chromatography in which an eluent is passed through the column at a linear velocity of 2 cm/min or more. In the latter case, the smaller the particle diameter, the higher the resolution. The reason why a crosslinked copolymer having a high mechanical strength can be obtained by the method of the present invention has not yet been fully elucidated. However, the reason is presumed to be as follows. In the present invention, a crosslinked copolymer is produced by first copolymerizing a monomer having an alkyl group of small chain length with a crosslinking agent to obtain an intermediate copolymer and then, substituting the alkyl group of small chain length with an alkyl group of large chain length. Accordingly, in the method of the present invention, the molecules of the monomer are thoroughly bonded with each other during the copolymerization step without being much affected by any steric hindrance, leading to the production of a crosslinked copolymer having a sufficient rigidity.

By contrast, the polymer disclosed in Japanese Patent Application Laid-Open Specification 58-61463/1983 (corresponding to U.S. Pat. No. 4,497,710 and U.K. Patent No. 2,107,333) is too soft to be used as a packing for a column for use in high performance liquid chromatography. The reason why this polymer is too soft is presumed to reside in that the polymer of this reference is produced by direct copolymerization of a monomer having an alkyl group of high bulkiness with a small amount of a crosslinking agent, in which copolymerization generally only 10 to 80 parts by weight of the crosslinking agent is employed per 100 parts by weight of the monomer and that, therefore, the bonding between the molecules of the monomer is caused to be insufficient due to steric hindrance.

Moreover, by the method of the present invention, crosslinked copolymer having pores of uniform morphology can be obtained with good reproducibility even when a mixture of solvents having different solubility parameters are used.

The hydrophobic crosslinked copolymer of the present invention comprising 90 to 6000 parts by weight of crosslinking monomer units per 100 parts by weight of monomer units is advantageously rigid and has an excellent mechanical strength. Accordingly, by the use of the crosslinked copolymer of the present invention as a packing for a liquid chromatography column, elution can be conducted at a high flow rate, thereby enabling analysis and separation of substances to be performed at high speed. With respect to the liquid chromatography column packed with the hydrophobic crosslinked copolymer of the present invention, customary eluents having a viscosity of about 2 cps or less can be passed through the column at a linear velocity satisfying the inequality:

$$F > 0.05 D^2$$

wherein F represents a linear velocity of eluent (cm/min) and D represents the weight average particle diameter of copolymer (μm). The weight average particle diameter of the hydrophobic crosslinked copolymer of the present invention, when it is employed in the form of particles, is not critical. However, the diameter is generally in the range of from about 1 to about 500 μm. When a crosslinked copolymer having a weight average particle diameter of 10 μm is packed into a column of 6 mm in inside diameter and 150 mm in length, the eluent can be passed at a flow rate of 1.4 ml/min. Further, when a crosslinked copolymer having a weight average particle diameter of 50 μm is packed into a column of 6 mm in inside diameter and 150 mm in length, the eluent can be passed at a flow rate of 35 ml/min. If desired, the eluent can be passed at a high pressure such as 100 Kg/cm$^2$ or more. Even under such a high pressure, the crosslinked copolymer advantageously does not undergo deformation or break down.

A packing for liquid chromatography column comprising silica gel as a matrix and, bonded to the surface thereof, a hydrophobic group such as an octadecyl group is chemically unstable and often undesirably adsorbs basic substances. By contrast, the hydrophobic crosslinked copolymer of the present invention is chemically stable and does not substantially adsorb basic substances and is, therefore, advantageous as a packing for a liquid chromatography column.

Moreover, the specific surface area and acetonitrile regain value of the hydrophobic crosslinked copolymer of the present invention are respectively in the range of from 30 to 1000 m$^2$/g and 0.2 to 3.0 ml/g. When the copolymer of the present invention is employed as a packing for a liquid chromatography column, the above characteristics of the copolymer enable the column to exhibit an advantageously sharp peak, i.e. advantageously small elution band width, and an advantageously large number of theoretical plates with respect to each of the substances to be separated, as compared with the conventional packings comprised of a synthetic copolymer. This is true even with respect to substances which exhibit a high hydrophobic interaction with the packing of the column.

DETAILED DESCRIPTION OF THE PREFERRED EMBODIMENT

This invention will now be described in detail with reference to the following Examples and Comparative Examples but they should not be construed to be limiting the scope of the present invention.

EXAMPLE 1

Preparation of copolymer

A homogeneous mixture of 10 g of vinyl stearate, 545 g of triallyl isocyanurate, 390 g of butyl acetate and 14 g of 2,2′-azobisisobutylonitrile together with 3100 ml of an aqueous solution containing, dissolved therein, 1% by weight of polyvinyl alcohol and 1% by weight of sodium phosphate was introduced into a 10-liter three-necked flask equipped with a reflux condenser, a tube for introducing nitrogen gas and an agitator. The resulting mixture was agitated well, followed by polymerization at 80° C. for 20 hours while stirring under a stream of nitrogen gas, thereby obtaining particles of a hydrophobic crosslinked copolymer in the form of a gel. The gel was subjected to filtration, water washing and acetone extraction, followed by classifying, thereby obtaining particles of 8.8 μm in weight average particle diameter. The polymerization yield was 92%. With respect to the gel, the SA was 40 m²/g and the AR was 1.05 ml/g.

Test of copolymer

Using methanol as a liquid for packing, the above obtained gel was packed into a stainless steel column of 6 mm in inside diameter and 150 mm in length under a pressure of 60 Kg/cm² Using the resulting packed column, chromatography in which an 80% aqueous solution of methanol as an eluent was passed through the column at a flow rate of 1 ml/min was conducted with respect to ethylene glycol and dodecanol. In the chromatography, use were made of a thermostat bath maintained at a temperature of 30° C. and, as a detector, a differential refractometer of model SE-51 (manufactured and sold by Showa Denko K. K., Japan). The elution volume and number of theoretical plates for ethylene glycol were 3.3 ml and 9000, respectively. The elution volume and number of theoretical plates for dodecanol were 26.3 ml and 8300, respectively. The number of theoretical plates was calculated according to "High Speed Liquid Chromatography Handbook" edited by the Kanto Branch of Japanese Society of Analytical Chemistry and published by Maruzen Co., Ltd., Japan. By this test, it was found that a compound such as dodecanol having a high hydrophobic property can exhibit a value of number of theoretical plates substantially identical with that of a compound such as ethylene glycol having a low hydrophobic property. Further, using the above-mentioned column, various peptides were subjected to chromatography analysis under the conditions as indicated below. The results are shown in Table 1.

CHROMATOGRAPHY CONDITIONS

Eluent, initial composition: 0.05% aqueous solution of TFA/MeCN=75/25 by volume
  final composition: 0.05% aqueous solution of TFA/-MeCN=10/90 by volume
  (TFA=trifluoroacetic acid,MeCN=acetonitrile)
  Linear gradient from initial eluent to final eluent for 40 min.
Flow rate of the eluent; 0.7 ml/min.
Thermostat bath temperature: 30° C.
System for feeding the eluent: two HPLC pumps of model 880Pu and a system controller of model 801-SC (both manufactured and sold by Japan Spectroscopic Co., Ltd., Japan)
Detection: UV 280 nm, AUFS(absorbance unit full scale) 0.32
Detector: UVIDEC(trade mark) 100-IV (manufactured and sold by Japan Spectroscopic Co., Ltd., Japan)
Data processor: SIC-7000B (manufactured and sold by System Instrument Co., Ltd., Japan)
Load of peptide: 40 μg dissolved in 10 μl of initial eluent

TABLE 1

| Specimen | Peak elution volume (ml) | Recovery (%) |
|---|---|---|
| Methionine-enkephalin | 5.2 | 92 |
| Angiotensin-I | 3.0 | 106 |
| Insulin | 6.2 | 101 |
| Cytochrome C | 5.2 | 93 |

As indicated in Table 1, the recovery of each peptide was high.

EXAMPLE 2

Preparation of copolymer

Into a 5-liter three-necked flask provided with a reflux condenser, a tube for introducing nitrogen gas and an agitator was charged a homogeneous liquid mixture of 100 g of vinyl acetate, 180 g of triallyl isocyanurate, 190 g of butyl acetate and 7 g of 2,2' azobisisobutyronitrile together with 1600 ml of an aqueous solution containing, dissolved therein, 1% by weight of polyvinyl alcohol and 1% by weight of sodium phosphate. While stirring, the resulting mixture was heated at 60° C. for 16 hours under a stream of nitrogen gas to effect polymerization, thereby obtaining particles of a copolymer in the form of a gel. The gel was subjected to filtration, water washing and acetone extraction. Then, the gel was dried. The yield of the copolymer was 96%. The thus obtained gel and a solution of 30 g of sodium hydroxide in 3 liters of water were charged into a 5-liter three-necked flask provided with a reflux condenser, a tube for introducing nitrogen gas and an agitator, and agitated at 15° C. for 20 hours under a stream of nitrogen gas to effect saponification reaction of the copolymer. After completion of the reaction, the copolymer was collected by filtration and washed with water, followed by drying. The concentration of the hydroxyl groups formed by the saponification reaction was determined to be 0.8 meq/g of the copolymer. The determination of the concentration of hydroxyl groups was conducted in accordance with the method described in U.S. Pat. No. 4,368,275.

Subsequently, 250 g of the thus obtained copolymer and 3 liters of a pyridine solution containing, dissolved therein, 200 g of stearoyl chloride were charged into a 10-liter three-necked flask provided with a reflux condenser, a tube for introducing nitrogen gas and an agitator, and were heated at 40° C. for 20 hours under a stream of nitrogen gas while stirring to effect reaction between the copolymer and the stearoyl chloride. After completion of the reaction, the copolymer was collected by filtration and washed with chloroform and then acetone, thereby obtaining a hydrophobic crosslinked copolymer in the form of a gel. The weight average particle diameter of the thus obtained gel was 9.1 μm. The hydroxyl group concentration of the gel was 0 meq/g. The calculation from the starting composition for polymerization, the hydroxyl group concentration after the saponification, and the amount of strearoyl groups introduced into the copolymer showed that the thus obtained gel consisted of 45.1 parts by weight of vinyl stearate units (monomer units having hydrophobic groups), 54.9 parts by weight of vinyl acetate units (other monomer units than the above-mentioned monomer units) and 120.1 parts by weight of triallyl isocyanurate units (crosslinking units). With respect to the gel, the SA and AR were 160 m$^2$/g and 0.52 ml/g, respectively.

In substantially the same manner as in Example 1, the thus obtained gel was packed into a stainless steel column of 6 mm in inside diameter and 150 mm in length under a pressure of 100 Kg/cm$^2$, using methanol as a liquid for packing. An 80% by weight aqueous solution of methanol was passed through the packed column at a flow rate of 2 ml/min for 16 hours. The difference between the pressure value at the column inlet and that at the column outlet was constant at 40 Kg/cm$^2$ throughout the passage of the solution, which attested to a high rigidity of the gel.

Using the packed column, chromatographic analysis was conducted with respect to ethylene glycol and dodecanol under substantially the same conditions as in Example 1. As a result, the elution volume and number of theoretical plates for ethylene glycol were 2.6 ml and 4200, respectively. On the other hand, the elution volume and number of theoretical plates for dodecanol were 16.5 ml and 4300, respectively.

EXAMPLE 3

Preparation of copolymer

Suspension polymerization was conducted in substantially the same manner as in Example 2 except that use was made of a homogeneous liquid mixture of 100 g of vinyl acetate, 145 g of triallyl isocyanurate, 170 g of butyl acetate and 6 g of 2,2'-azobisisobutyronitrile, thereby obtaining a particulate copolymer. The polymerization yield was 94%. The dried copolymer was subjected to saponification in substantially the same manner as in Example 2 except that a solution of 16 g of sodium hydroxide in 2.5 liters of water was employed, thereby obtaining a copolymer having a hydroxyl group concentration of 0.4 meq/g. Further, a reaction was effected between 200 g of the thus obtained copolymer and stearoyl chloride in substantially the same manner as in Example 2 except that 90 g of stearoyl chloride was used. After completion of the reaction, the copolymer was treated in substantially the same manner as in Example 2, thereby obtaining a hydrophobic crosslinked copolymer in the form of a gel. With respect to the thus obtained gel, the weight average particle diameter and hydroxyl group concentration were measured to be 8.5 $\mu$m and 0 meq/g, respectively. The calculation from the starting composition for polymerization, the hydroxyl group concentration after the saponification, and the amount of stearoyl groups introduced showed that the thus obtained gel consisted of 23.8 parts by weight of vinyl stearate units (monomer units having hydrophobic groups), 76.2 parts by weight of vinyl acetate units (other monomer units than the above-mentioned monomer units) and 120.0 parts by weight of triallyl isocyanurate units (crosslinking units). With respect to the gel, the SA and AR were 270 m$^2$/g and 0.8 ml/g, respectively.

Test of copolymer

In substantially the same manner as in Example 1, the thus obtained gel was packed into a stainless steel column of 6 mm in inside diameter and 150 mm in length under a pressure of 100 kg/cm$^2$, using methanol as a liquid for packing. An 80% by weight aqueous solution of methanol was passed through the packed column at a flow rate of 2 ml/min for 16 hours. The difference between the pressure value at the column inlet and that at the column outlet was constant at 42 Kg/cm$^2$, which attested to a high rigidity of the gel.

Using the packed column, chromatographic analysis was conducted with respect to ethylene glycol and dodecanol under substantially the same conditions as in Example 1. As a result, the elution volume and number of theoretical plates for ethylene glycol were 2.7 ml and 4300, respectively. On the other hand, the elution volume and number of theoretical plates for dodecanol were 18.1 ml and 4400, respectively.

COMPARATIVE EXAMPLE 1

Preparation of copolymer

Suspension polymerization was conducted in substantially the same manner as in Example 2 except that use was made of a homogeneous liquid mixture of 100 g of vinyl acetate, 43.0 g of triallyl isocyanurate, 30 g of butyl-n-acetate and 3.6 g of 2,2'-azobisisobutyronitrile, thereby obtaining a particulate copolymer. The polymerization yield was 94%. The dried copolymer was subjected to saponification in substantially the same manner as in Example 2 except that a solution of 9.5 g of sodium hydroxide in 1.5 liters of water was employed, thereby obtaining a copolymer having a hydroxyl group concentration of 1.5 meq/g.

Further, a reaction was effected between 100 g of the thus obtained copolymer and stearoyl chloride in substantially the same manner as in Example 2 except that 200 g of stearoyl chloride together with 1.5 liters of pyridine was used. After completion of the reaction, the copolymer was treated in substantially the same manner as in Example 2, thereby containing an ultimate copolymer in the form of a gel. With respect to the thus obtained gel, the weight average particle diameter and hydroxyl group concentration were measured to be 9.5 $\mu$m and 0 meq/g, respectively. The calculation from the starting composition for polymerization, the hydroxyl group concentration after the saponification, and the amount of stearoyl group introduced showed that the thus obtained gel consisted of 42.5 parts by weight of vinyl stearate units (monomer units having hydrophobic groups), 57.5 parts by weight of vinyl acetate units (other monomer units than the above-mentioned monomer units) and 27.5 parts by weight of triallyl isocyanurate units (crosslinking units). With respect to the gel, the SA and AR were 1 m$^2$/g and 0.18 ml/g, respectively.

Test of copolymer

The thus obtained gel was packed into a stainless steel column of 6 mm in inside diameter and 150 mm in length under a pressure of 60 kg/cm$^2$, using methanol as a liquid for packing.

Using the packed column, chromatographic analysis was conducted with respect to ethylene glycol and dodecanol under substantially the same conditions as in Example 1. As a result, the elution volume and number of theoretical plates for ethylene glycol were 2.8 ml and 4200, respectively. The elution volume for dodecanol, which is a hydrophobic substance, was 7.1 ml. This was small as compared with the elution volume in Example 1. The number of theoretical plates for dodecanol was 1200, which was considerably lower than that for ethylene glycol.

COMPARATIVE EXAMPLE 2

Preparation of copolymer

Suspension polymerization was conducted in substantially the same manner as in Example 2 except that use was made of a homogeneous liquid mixture consisting of 30 g of vinyl stearate, 30 g of vinyl acetate, 12 g of triallyl isocyanurate, 40 g of ethyl acetate and 1.8 g of lauroyl peroxide, thereby obtaining a particulate copolymer having a weight average particle diameter of 15 μm. The polymerization yield was 90%. With respect to the gel, the SA and AR were 1 m²/g and 0.26 ml/g, respectively.

In the same manner as in Example 1, it was attempted to pack the gel in a stainless steel column of 6 mm in inner diameter of 150 mm in length under a pressure of 60 kg/cm², using methanol as a liquid for packing. But, the methanol could not be satisfactorily passed through the column and, hence, any packed column having a good performance was not obtained.

EXAMPLE 4

100 g of the copolymer gel having a hydroxyl group concentration of 0.8 meq/g obtained in Example 2, 50 g of octanoyl chloride, 30 g of pyridine and 2 liters of toluene were charged into a 5-liter three-necked flask provided with a reflux condenser, a tube for introducing nitrogen gas and an agitator, and the copolymer was reacted with the octanoyl chloride in the same manner as in Example 2. The thus obtained copolymer was collected by filtration and washed in substantially the same manner as in Example 2, thereby obtaining a hydrophobic crosslinked copolymer in the form of a gel. The gel had a weight average particle diameter of 9.1 μm and a hydroxyl group concentration of 0 meq/g. The calculation from the starting composition for polymerization, the hydroxyl group concentration after the saponification, and the amount of stearoyl group introduced showed that the thus obtained gel consisted of 31.1 parts by weight of vinyl octanoate units (monomer units having hydrophobic groups), 68.9 parts by weight of vinyl acetate units (other monomer units than the above-mentioned monomer units) and 150.8 parts by weight of triallyl isocyanurate units (crosslinking units). With respect to the gel, the SA and AR were 180 m²/g and 0.6 ml/g, respectively.

In substantially the same manner as in Example 1, the thus obtained gel was packed into a stainless steel column of 6 mm in inside diameter and 150 mm in length under a pressure of 100 kg/cm², using methanol as a liquid for packing.

An 80% by weight aqueous solution of methanol was passed through the packed column at a flow rate of 2 ml/min for 16 hours. The difference between the pressure value at the column inlet and that at the column outlet was constant at 45 Kg/cm², which attested to a high rigidity of the gel.

Using the packed column, chromatographic analysis was conducted with respect to ethylene glycol and dodecanol under substantially the same conditions as in Example 1. As a result, the elution volume and number of theoretical plates for ethylene glycol were 2.6 ml and 5000, respectively. On the other hand, the elution volume and number of theoretical plates for dodecanol were 12.8 ml and 5800, respectively.

COMPARATIVE EXAMPLE 3

Preparation of copolymer

Suspension polymerization was conducted in substantially the same manner as in Example 2 except that use was made of a homogeneous liquid mixture of 100 g of vinyl acetate, 43 g of triallyl isocyanurate, 50 g of butyl acetate and 3.6 g of 2,2'-azobisisobutyronitrile, thereby obtaining particulate copolymer. The polymerization yield was 94%. The dried copolymer was subjected to saponification in substantially the same manner as in Example 2 except that a solution of 46 g of sodium hydroxide in 1.5 liters of water was employed, thereby obtaining a copolymer having a hydroxyl group concentration of 1.7 meq/g. 100 g of the thus obtained copolymer, 20 g of stearoyl chloride, 10 g of pyridine and 2 liters of toluene were charged into a 5-liter three-necked flask provided with a reflux condenser, a tube for introducing nitrogen gas and an agitator, and the copolymer was reacted with the stearoyl chloride in the same manner as in Example 2. The thus obtained copolymer was collected by filtration and washed in substantially the same manner as in Example 2, thereby containing a gel. The gel had a weight average particle diameter of 9.1 μm and a hydroxyl group concentration of 1.3 meq/g. The calculation from the starting composition for polymerization, the hydroxyl group concentration after the saponification, and the amount of stearoyl groups introduced showed that the thus obtained gel consisted of 16 parts by weight of vinyl stearate units (monomer units having hydrophobic groups), 76 parts by weight of vinyl acetate units, 8 parts b weight of vinyl alcohol units and 40 parts by weight of triallyl isocyanurate units (crosslinking units). With respect to the gel, the SA and AR were 20 m²/g and 0.48 ml/g, respectively.

The thus obtained gel was packed into a stainless steel column of 6 mm in inside diameter and 150 mm in length under a pressure of 60 Kg/cm², using methanol as a liquid for packing.

Using the packed column, chromatographic analysis was conducted with respect to ethylene glycol and dodecanol under substantially the same conditions as in Example 1. As a result, the elution volume and number of theoretical plates for ethylene glycol were 2.6 ml and 4800, respectively. The elution volume for dodecanol, which is a hydrophobic substance, was 4.6 ml. This was small as compared with the value obtained in Example 1. The number of theoretical plate for dodecanol was 800, which was considerably lower than that for ethylene glycol.

EXAMPLE 5

Preparation of copolymer

Suspension polymerization was conducted in substantially the same manner as in Example 2 except that use was made of a homogeneous liquid mixture of 100 g of vinyl acetate, 225 g of triallyl cyanurate, 230 g of butyl acetate and 8 g of 2,2'-azobisisobutyronitrile, thereby obtaining a particulate copolymer. The polymerization yield was 92%. The dried copolymer was subjected to saponification in substantially the same manner as in Example 2 except that a solution of 30 g of sodium hydroxide in 3 liters of water was employed, thereby obtaining a copolymer having a hydroxyl group concentration of 0.7 meq/g.

300 g of the thus obtained copolymer, 3 liters of toluene containing 70 g of butanoyl chloride, and 60 g of prydine were charged into a 10-liter three-necked flask provided with a reflux condenser, a tube for introducing nitrogen gas and an agitator, and the copolymer was reacted with the butanoyl chloride under the same conditions as in Example 2. The thus obtained copolymer was collected by filtration and washed in substantially the same manner as in Example 2, thereby obtaining a hydrophobic crosslinked copolymer in the form of a gel. The gel had a weight average particle diameter of 10.5 μm and a hydroxyl group concentration of 0 meq/g. The calculation from the starting composition for polymerization, the hydroxyl group concentration after the saponification, and the amount of butanoyl groups introduced showed that the thus obtained gel consisted 25 parts by weight of vinyl butanoate units (monomer units having hydrophobic groups), 75 parts by weight of vinyl acetate units (other monomer units than the above-mentioned monomer units) and 211 parts by weight of triallyl isocyanurate units (crosslinking units). With respect to the gel, the SA and AR were 200 m²/g and 0.76 ml/g, respectively.

In substantially the same manner as in Example 1, the gel was packed into a stainless steel column of 6 mm in inside diameter and 150 mm in length under a pressure of 100 Kg/cm², using methanol as a liquid for packing.

An 80% by weight aqueous solution of methanol was passed through the packed column at a flow rate of 2 ml/min for 16 hours. The difference between the pressure value at the column inlet and that at the column outlet was constant at 30 Kg/cm² throughout the passage of the solution.

Using the packed column, chromatographic analysis was conducted with respect to ethylene glycol and dodecanol under substantially the same conditions as in Example 1. As a result, the elution volume and number of theoretical plates for ethylene glycol were 2.6 ml and 4200, respectively. On the other hand, the elution volume and number of theoretical plates for dodecanol were 9.8 ml and 4300, respectively.

What is claimed is:

1. A hydrophobic crosslinked copolymer consisting essentially of:
   (A) 100 parts by weight of monomer units consisting essentially of:
      (1) 10 to 100% by weight, based on the total weight of the monomer units (A), of a monomer unit represented by the formula selected from the group consisting of:

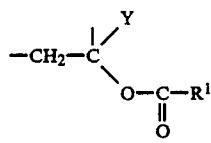

and

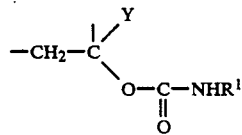

wherein $R^1$ represents at least one hydrophobic group having a hydrophobic fragmental constant of at least 1.5, and Y represents a hydrogen atom or a methyl group; and
      (2) 0 to 90% by weight, based on a total weight of the monomer units (A), of monomer units other than the monomer units of the formula (I) and (III); and (B) 90 to 6000 parts by weight of crosslinking monomer units derived from a crosslinking agent represented by the formula:

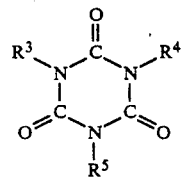

or

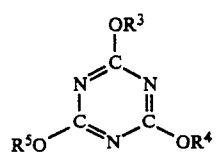

in which $R^3$, $R^4$ and $R^5$ each independently represent $-CH_2-CH=CH_2$, $-CH_2-C\equiv CH$ or

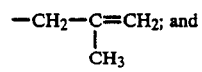

wherein said copolymer has:
a specific surface area (SA) in the range satisfying the inequality;

$30 \leq SA \leq 1000$ m²/g; and an acetonitrile regain value (AR) in the range satisfying the inequality:

$0.2 \leq AR \leq 3.0$ ml/g.

2. The copolymer according to claim 1, wherein said monomer units other than the monomer units of the formula (I) and (III) are monomer units derived from a member selected from the group consisting of vinyl acetate, vinyl propionate, methyl acrylate and methyl methacrylate.

3. The copolymer according to claim 1, wherein the hydrophobic group is a member selected from the group consisting of an alkyl group having 3 to 30 carbon atoms and a group represented by the formula

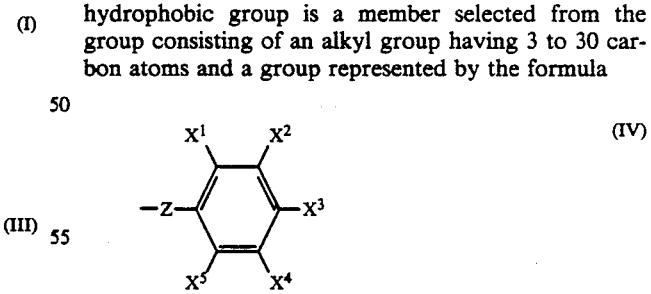

wherein Z represents a bond or an alkylene group of the formula $-C_nH_{2n}-$ in which n is an integer of 1 to 30, and $X^1$, $X^2$, $X^3$, $X^4$ and $X^5$ each independently represent a member selected from the group consisting of a hydrogen atom, a chlorine atom, a bromine atom, an iodine atom and an alkyl group having 1 to 30 carbon atoms.

4. A packing for use in reversed phase participation chromatography comprising a hydrophobic crosslinked copolymer consisting essentially of:

(A) 100 parts by weight of monomer units consisting essentially of:
  (1) 10 to 100% by weight, based on the total weight of the monomer units (A), of a monomer unit represented by the formula selected from the group consisting of:

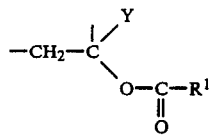

and

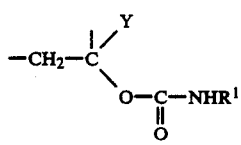

wherein $R^1$ represents at least one hydrophobic group having a hydrophobic fragmental constant of at least 1.5, and Y represents a hydrogen atom or a methyl group; and
  (2) 0 to 90% by weight, based on the total weight of the monomer units (A), of monomer units other than the monomer units of the formulae (I) and (III); and
(B) 90 to 6000 parts by weight of crosslinking monomer units derived from a crosslinking agent represented by the formula:

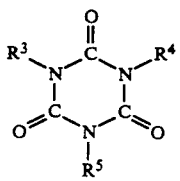

or

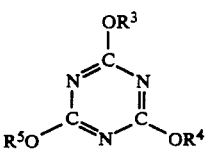

in which $R^3$, $R^4$ and $R^5$ each independently represent $-CH_2-CH=CH_2$, $-CH_2-C\equiv CH$ or

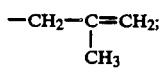

and wherein said copolymer has:
a specific surface area (SA) in the range satisfying the inequality:

$30 \leq SA \leq 1000$ m$^2$/g; and an acetonitrile regain value (AR) in the range satisfying the inequality:

$0.2 \leq AR \leq 3.0$ ml/g.

* * * * *